(12) United States Patent
Lupke et al.

(10) Patent No.: US 8,075,295 B2
(45) Date of Patent: Dec. 13, 2011

(54) ALIGNABLE COOLING PLUG FOR EXTRUDER

(76) Inventors: Manfred A. A. Lupke, Thornhill (CA);
Stefan A. Lupke, Thornhill (CA)

( * ) Notice: Subject to any disclaimer, the term of this patent is extended or adjusted under 35 U.S.C. 154(b) by 75 days.

(21) Appl. No.: 12/599,438

(22) PCT Filed: Mar. 31, 2008

(86) PCT No.: PCT/CA2008/000528
§ 371 (c)(1),
(2), (4) Date: Nov. 9, 2009

(87) PCT Pub. No.: WO2008/134851
PCT Pub. Date: Nov. 13, 2008

(65) Prior Publication Data
US 2010/0303942 A1  Dec. 2, 2010

(51) Int. Cl.
*B29C 47/78* (2006.01)
(52) U.S. Cl. ............... 425/113; 425/369; 425/378.1

(58) Field of Classification Search .......... 425/396, 425/378.1, 113, 369
See application file for complete search history.

(56) References Cited

U.S. PATENT DOCUMENTS

| | | | |
|---|---|---|---|
| 4,770,618 A * | 9/1988 | Lupke | 425/72.1 |
| 4,867,928 A * | 9/1989 | Jarvenkyla et al. | 264/508 |
| 4,995,800 A * | 2/1991 | Lupke | 425/131.1 |
| 5,120,212 A * | 6/1992 | Reiber et al. | 425/141 |
| 5,123,827 A * | 6/1992 | Lupke | 425/133.1 |
| 6,155,813 A * | 12/2000 | Lupke et al. | 425/326.1 |

* cited by examiner

*Primary Examiner* — Joseph Del Sole
*Assistant Examiner* — Kimberly A Stewart

(57) ABSTRACT

A molding apparatus for the manufacture of pipe advantageously uses a cooling plug that is adjustably-secured to the extrusion head to compensate for misalignment of the extrusion head relative to recirculating mold blocks. This provides a simplified adjustment for adjusting the molding apparatus to correct for wall thickness variations in the molded pipe. This apparatus can be used in combination with existing alignment systems.

16 Claims, 5 Drawing Sheets

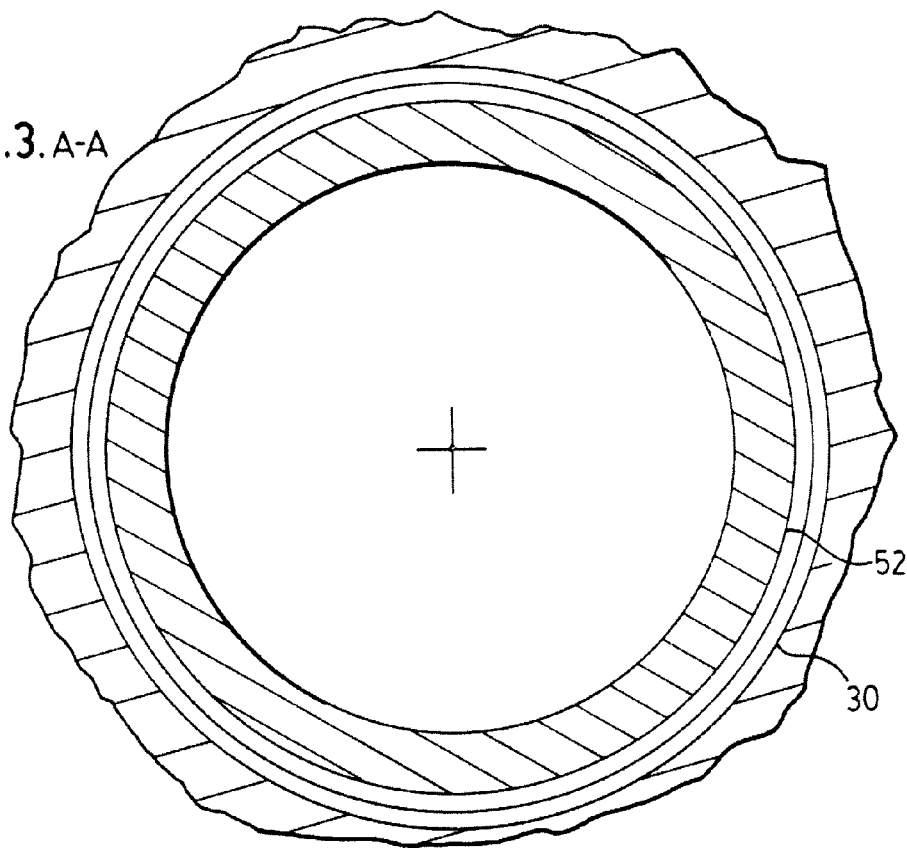
FIG.3.A-A
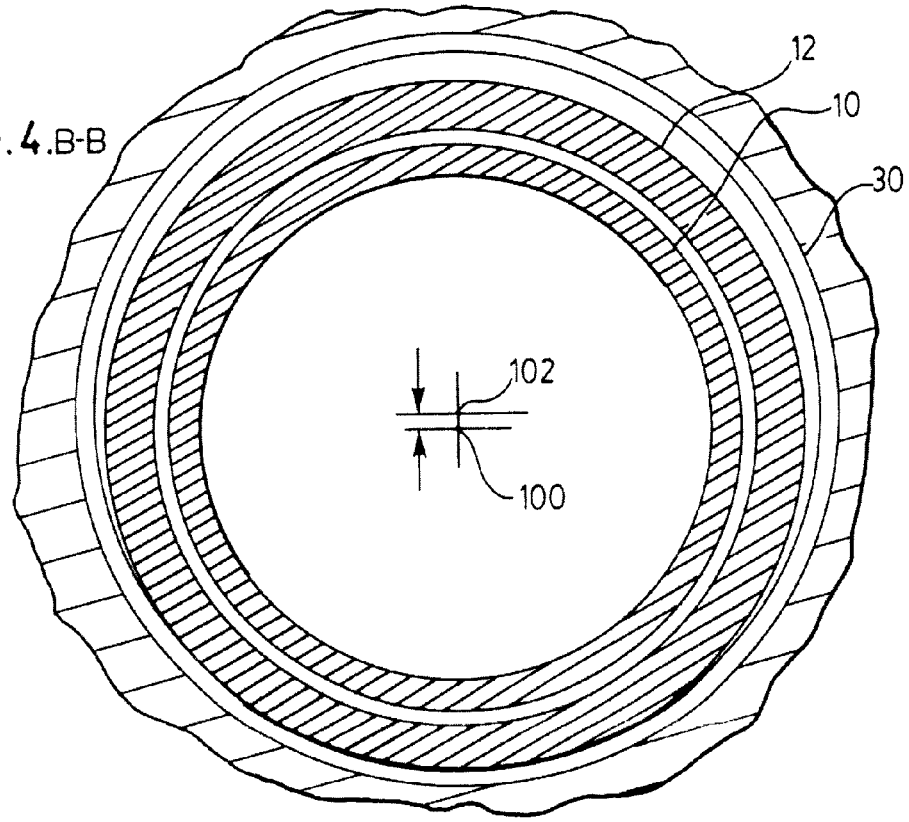
FIG.4.B-B

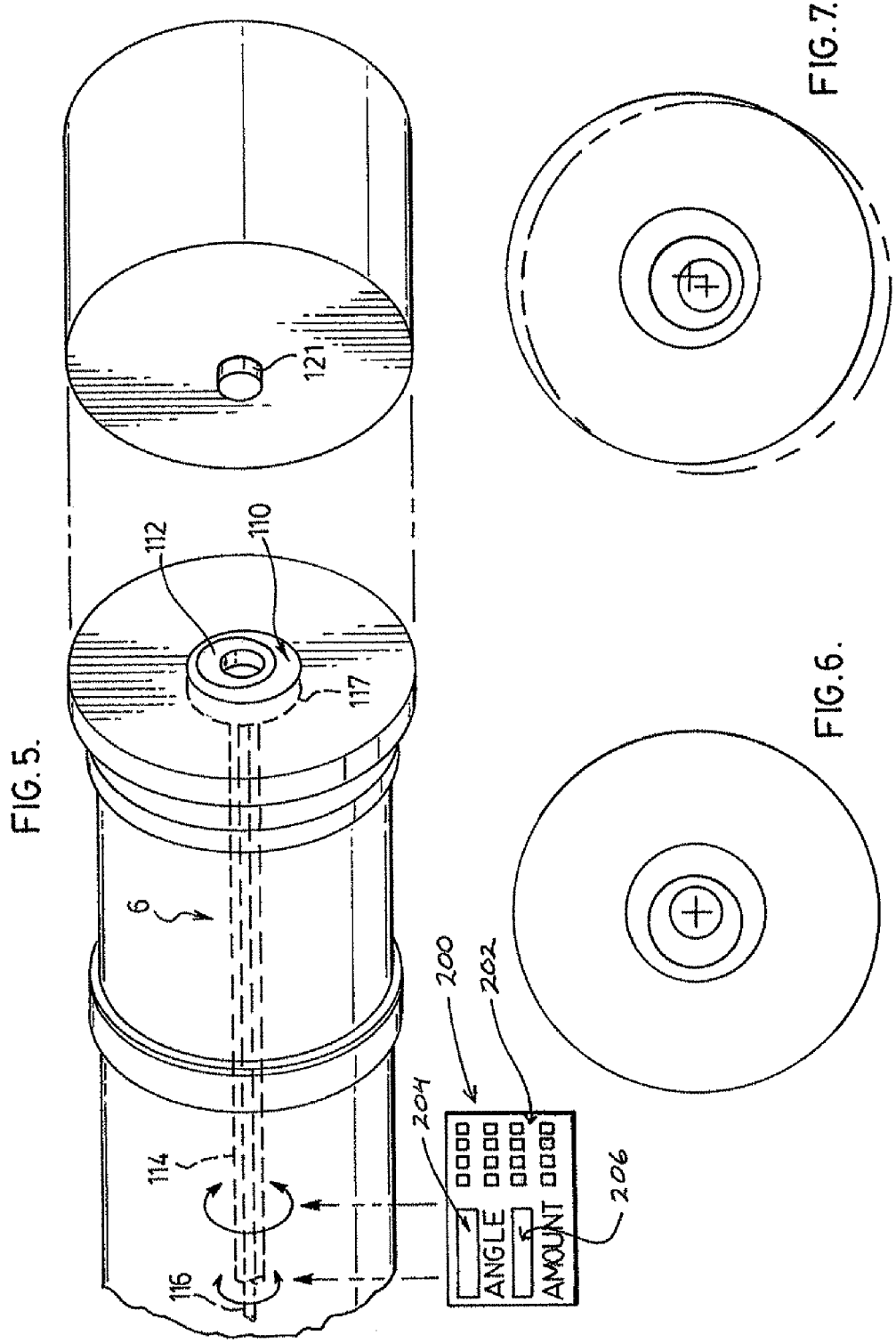

ALIGNABLE COOLING PLUG FOR EXTRUDER

FIELD OF THE INVENTION

The present invention relates to a method and apparatus for the manufacture of plastic pipe and in particular, high strength plastic pipe.

BACKGROUND OF THE INVENTION

Various methods have been used for forming double wall corrugated pipe. The corrugations of the double wall pipe are initially formed from a first stream of plastic drawn into contact with mold blocks that define the shape of the corrugations. A second stream of plastic is subsequently extruded to form the inner wall of the pipe and merges with the inner edge of the corrugations. The double wall corrugated plastic pipe, due to the effective placement of material, can withstand significant axial loads and is commonly used for forming of plastic pipe in a diverse range of diameters. In addition to its high strength, the double wall pipe has the advantage that the inner wall of the pipe provides a smooth interior surface for the flow of liquid along the length of the pipe.

In order to obtain the desired strength in the molded plastic pipe, it is important to effectively center the extruder, and in particular, the extruder head relative to the circulating or moving mold blocks of a corrugator. This alignment determines tolerance variations in the thickness of the walls from one side of the pipe to the other side of the pipe. Improved and consistent strength is obtained when there is little or no variation in the pipe wall thickness about the circumference of the pipe.

Various approaches have been used to adjust the alignment of the extrusion head with the recirculating mold blocks. The combined extrusion head, extruder, and corrugator, are large and have a high mass. Therefore, aligning of the extruding equipment to the corrugator is difficult and somewhat sophisticated. The other approach is to adjust the mold blocks of the corrugator while keeping the extruder fixed. Depending upon the manufacture of the corrugator equipment and the type of mold blocks being used, this approach may be slightly more advantageous but it is still difficult and time consuming. Furthermore, poor alignment is expensive as excess plastic material is used to obtain the necessary strength. Excess plastic also contributes to slower manufacturing rates and/or higher costs.

In the manufacture of high strength plastic pipe such as double wall pipe, some ribbed pipe and changing thickness solid wall pipe, a cooling plug is associated with the extruder head and is designed to initially support the inner wall of the pipe and to also remove heat therefrom.

The present invention discloses an improved method and apparatus for the manufacture of such high strength pipe where problems associated with the mold blocks leading to excessive tolerance variations in the thickness of the walls of the pipe, are reduced.

SUMMARY OF THE INVENTION

A molding apparatus for forming pipe according to the present invention comprises an extruder, an extrusion head, a cooling plug and moving mold blocks defining an exterior surface of the pipe. The cooling plug is adjustably secured to the extrusion head by an adjustment mechanism for shifting of the cooling plug relative to an end of the extrusion head. The adjusting mechanism is operative during molding of the pipe to adjust alignment of the cooling plug with the mold blocks independent of the position of the extrusion head.

In an aspect of the invention, an end of the cooling plug includes a tapered transition surface located adjacent the extrusion head. The tapered transition surface forms a plastic flow transition path between the extrusion head and a body portion of the cooling plug.

In a preferred aspect of the invention, an upstream edge of the tapered transition surface is sized to remain within a cross sectional periphery of the extrusion head at a junction of the extrusion head and the cooling plug to accommodate a maximum offset of the longitudinal axis of cooling plug relative to the longitudinal axis of said extrusion head.

In a further aspect of the invention, the extrusion head includes two extrusion passages with a first extrusion passage for extruding plastic for forming outer corrugations of the pipe and a second downstream passage for extruding plastic for forming an inner smooth wall of the pipe.

In a different aspect of the invention, a controller is provided for adjusting the longitudinal axis of the cooling plug relative to the longitudinal axis of the extruder. Preferably, the controller includes an angular input and a dimensional input for an operator to control adjustment of the cooling plug.

In an aspect of the invention, the adjustment mechanism includes at least two adjustable locating members engaging the cooling plug and the extrusion head and controlling the longitudinal alignment therebetween.

In a further aspect of the invention, the adjustment mechanism includes two cam members with each cam member rotating about a different rotational axis, the cam members cooperating for adjusting the position of the cooling plug relative to the extrusion head.

In a different aspect of the invention, the adjustment mechanism includes at least two piston members for varying the position of the cooling plug on an end of the extrusion head.

In yet a further aspect of the invention, the adjustment mechanism includes at least three piston members disposed at different angular positions with the pistons controlling the position of the cooling plug on an end of the extrusion head.

In a preferred aspect of the invention, the adjustment mechanism includes at least a first pair of opposed pistons and a second pair of opposed pistons positioned to engage an interior surface of the cooling plug and the extrusion head.

In as aspect of the invention, the adjustment mechanism includes a first cam rotatable within a second cam, the first cam engaging the cooling plug in an offset position relative to a rotational axis of the first cam, and wherein a rotational axis of the second cam is offset relative to a rotational axis of the first cam. Preferably, each of the cams is rotatable by means of a control member rotatably supported in the extrusion head.

BRIEF DESCRIPTION OF THE DRAWINGS

Preferred embodiments of the invention are shown in the drawings, wherein:

FIG. 3 is a sectional view taken along lines A-A of FIG. 2 showing an alignment between the cooling plug and the mold blocks;

FIG. 4 is a sectional view taken along lines B-B of FIG. 2 showing a misalignment of the extrusion head and the mold blocks;

FIG. 5 is a partial exploded perspective view showing one approach for allowing adjustment of the cooling plug relative to the extrusion head;

FIG. 6 is an end view of a double cam adjustment mechanism used to adjust the position of the cooling plug relative to the extrusion head;

FIG. 7 is a sectional view showing an adjustment of the cooling plug relative to the extrusion head to shift the cooling plug relative to the extrusion head;

DETAILED DESCRIPTION OF THE PREFERRED EMBODIMENTS

Figure 1:
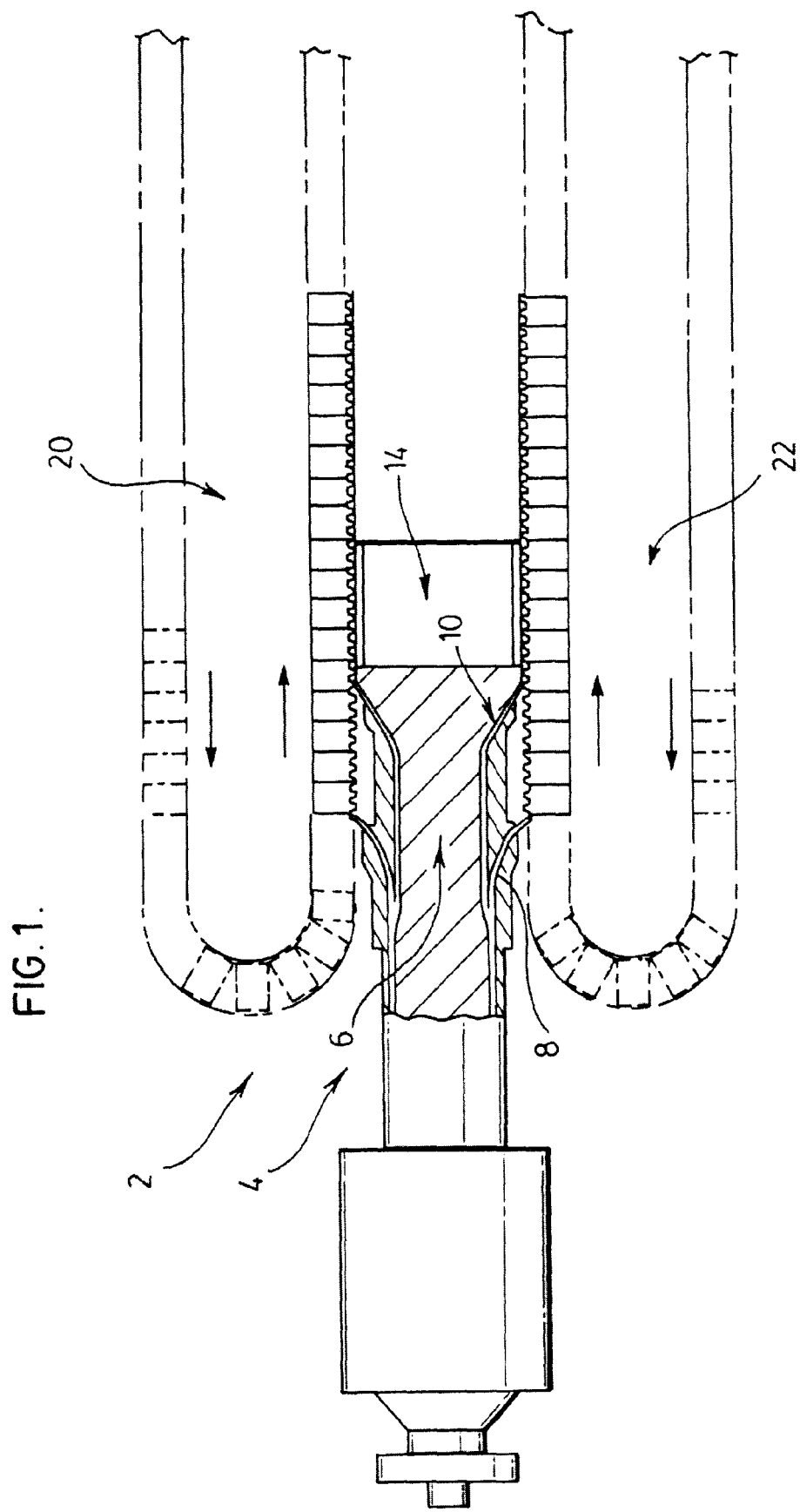
FIG. 1 is a schematic view of a corrugator for the manufacture of doubled wall corrugated pipe.

The molding apparatus 2 shown in FIG. 1 is a corrugator for forming of double wall pipe. The molding apparatus includes an extruder 4, an extrusion head 6 having a first extrusion passage 8 for extruding a first plastic stream to form the corrugations of the pipe. The extrusion head 6 includes a second extrusion passage 10 that extrudes a second plastic stream for forming the inner wall of the double wall pipe.

The extrusion head 6 includes a cooling plug 14 that is adjustably secured to the extrusion head and allows the longitudinal axis of the cooling plug to be adjusted and offset relative to the centerline or longitudinal axis of the extrusion head 6. The molding apparatus 2 includes two sets of recirculating mold blocks 20 and 22 that determine the outer wall of the corrugated pipe. A continuous series of opposed moving mold blocks are shown, however, other arrangements for having the mold blocks form a moving mold tunnel, for example, pulsating mold blocks, can be used. Therefore, the system disclosed herein can be used with any of the known mold blocks that cooperate to form a moving mold tunnel.

The molding apparatus 2 is shown for producing double wall corrugated pipe having outer corrugations and a continuous inner pipe. The outer corrugations in combination with the inner pipe cooperate to maximize the strength and durability of the pipe. In particular, the outer corrugations increase the radial stiffness of the pipe opposing collapse of the pipe. To maximize the strength or to produce a consistent strength of the double wall corrugated pipe, it is important that tolerance variations in the thickness of the walls of the pipe are not substantial.

These functions are also important for the manufacture of ribbed pipe, triple wall pipe, solid wall pipe having an outer stepped profile and other high strength pipes. The apparatus and method shown with respect to double wall pipe can also be used for other high strength plastic pipe.

In the prior art, the extruder 4 was adjustable relative to the recirculating mold blocks 20 and 22 to effectively align the extrusion head 6 with the centerline of the recirculating mold blocks. Some systems prefer to align the mold blocks relative to the extrusion head. Due to the weight and mass of each of these systems, adjustment thereof is difficult. In the prior art systems, the cooling plug is fixed on the end of the extrusion head and moved with the extruder.

Figure 2:
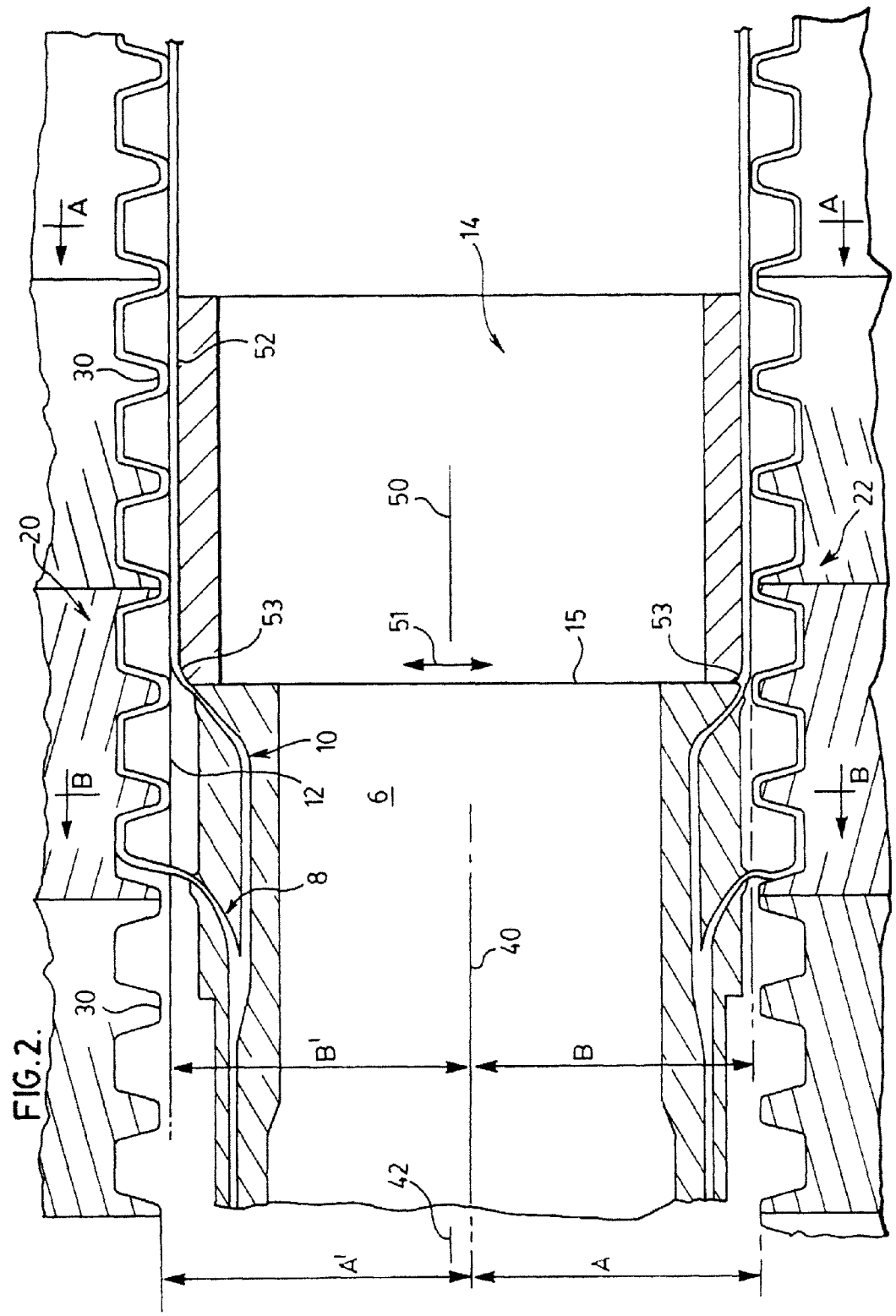
FIG. 2 is a partial sectional view of the extrusion head and cooling plug and associated mold blocks of the corrugator.

The sectional view of FIG. 2 shows the relationship of the extrusion head 6, the cooling plug 14 and the recirculating mold blocks 20 and 22 for the manufacture of double wall pipe. Basically, the recirculating mold blocks define the outer periphery of the pipe and these mold blocks, when in engagement with each other, define a moving mold tunnel with a centerline indicated as 42. The extrusion head 6, with two extrusion orifices, has a first plastic flow passage 8 for extruding plastic to form the corrugations of the pipe and a second flow passage 10 for extruding plastic to form the inner wall of the pipe. The recirculating mold blocks 20 and 22 typically have a vacuum arrangement for drawing of the first plastic stream into the corrugations of the mold block and the mold blocks also include a cooling arrangement for removing heat from the mold blocks to cool and set the corrugations of the plastic pipe. Different extrusion heads can be used.

The second stream of plastic extrudes through passage 10 and produces the inner wall of the pipe. The cooling plug 14 removes heat from the inner wall and also supports the inner wall of the pipe until sufficient stability of the inner wall is achieved. The cooling plug 14 includes its own centerline shown as 50. In the present structure, the cooling plug 14 is radially adjustable, relative to the centerline 40 of the extrusion head and can be offset thereto.

As shown in FIG. 2, the extrusion head 6 and the circular first passage 8 are not centered with respect to the centerline 50 of the mold blocks 20 and 22. The distance A from the centerline 40 of the extrusion head 6 to the inner edge of mold blocks 22 provided at the bottom edge of FIG. 2, relative to the distance A' from the centerline 40 of the extrusion head to the upper inner most edge of the recirculating mold blocks 20 are not equal. In the example shown, distance A is less than distance A'. Similarly, distance B equal to the distance from the centerline 40 of the extrusion head 6 to the inner edge of the plastic forming the corrugations is not equal to distance B'. In this case, the distance B is less than the distance B'.

If the cooling plug 14 was aligned with the extrusion head 6, then the thickness of the inner wall of the corrugated pipe formed adjacent a top edge of mold blocks 22, would be greater than the thickness of the inner wall formed adjacent a bottom edge of the mold blocks 20. Therefore, if the cooling plug 14 was aligned with the centerline of the extrusion head 6, a wide variation in the pipe wall thickness would occur and the strength of the pipe would be reduced.

This problem is overcome in the arrangement of FIG. 2 as the centerline 50 of the cooling plug 14 has been shifted or is offset relative to the centerline 40 of the extrusion head 6. The plastic exiting from the second passage 10 cooperates with the cooling plug 14 that is now aligned with the centerline of the mold blocks. With this arrangement, the cooling plug 14 assists in distributing the molten plastic of the inner wall to reduce variations in wall thickness tolerances. The mold blocks 20 and 22 draw the plastic that forms the corrugations and can accept misalignment with the extrusion head.

The cooling plug as shown in FIG. 2 includes a transition region 53 for guiding and distributing the plastic between the extrusion head 6 and the outer wall 52 of the cooling plug. Basically, as the cooling plug 14 can be misaligned relative to the extrusion head, a tapered transition region is formed at the abutting end of the cooling plug 14. This tapered transition region can be tapered, curved or conical, typically with any sharp junction points appropriately curved. In some cases, an air stream is used to further assist in guiding of the plastic flow onto the body of the cooling plug.

With the above structure, the position of the cooling plug 14 is adjusted relative to the centerline of the extrusion head 6, to provide alignment between the recirculating mold blocks 20 and 22 and the cooling plug 14. Various quality control steps can be carried out as the pipe is manufactured and any unacceptable tolerance variations in the thickness of the walls of the pipe can be corrected by an appropriate adjustment of the cooling plug relative to the extrusion head.

FIG. 3 is a sectional view taken along line A-A of FIG. 2 and illustrates the effective alignment of the cooling plug, and in particular, the outer wall 52 of the cooling plug with the inner surface 30 of the recirculating mold blocks 20 and 22 that define the centerline of moving mold tunnel.

FIG. 4 is a sectional view taken along line B-B of FIG. 2 and shows the misalignment of the extrusion head 6 (having a center line position 100) with the inner surface 30 of the recirculating mold blocks 20 and 22 (having a center line position 102). As evident from FIG. 4, there is a much greater gap between the mold blocks and the extrusion head at the upper edge of the mold tunnel, relative to the bottom edge of mold tunnel. As outlined above, this misalignment can be corrected by adjustment of the cooling plug on the head.

One arrangement for providing the radial adjustment of the centerline of the cooling plug 14 relative to the extrusion head 6, is shown in FIG. 5. The extrusion head 6 includes a first eccentric cam 110 rotatably mounted in a bearing 117 of the extrusion head 6 and a second eccentric cam 112 rotatably mounted within the first eccentric cam 110. The eccentric cam 110 is adjusted by rotating shaft 114 and the second eccentric cam is adjusted by rotation of shaft 116. These shafts extend through the extrusion head or are adjustable in any suitable manner through or within the extrusion head. The controller 200, can adjust the two eccentric cams 110 and 112 to appropriately move the cooling plug 14 relative to the extrusion head 6 to effect alignment of the cooling plug with the recirculating mold blocks 20 and 22. The cooling plug 14 includes a positioning stub 121 on the centerline of the cooling plug and offset relative to the centerline of eccentric cam 112.

The controller 200 includes a keypad 202 for entering an angular input 204 and a distance adjustment 206 used to move the cooling plug.

FIG. 6 is a first view showing the cooling plug 14 aligned with the extrusion head 6 and FIG. 7 shows an offset of the cooling plug 14 relative to the extrusion head 6.

Figure 8:
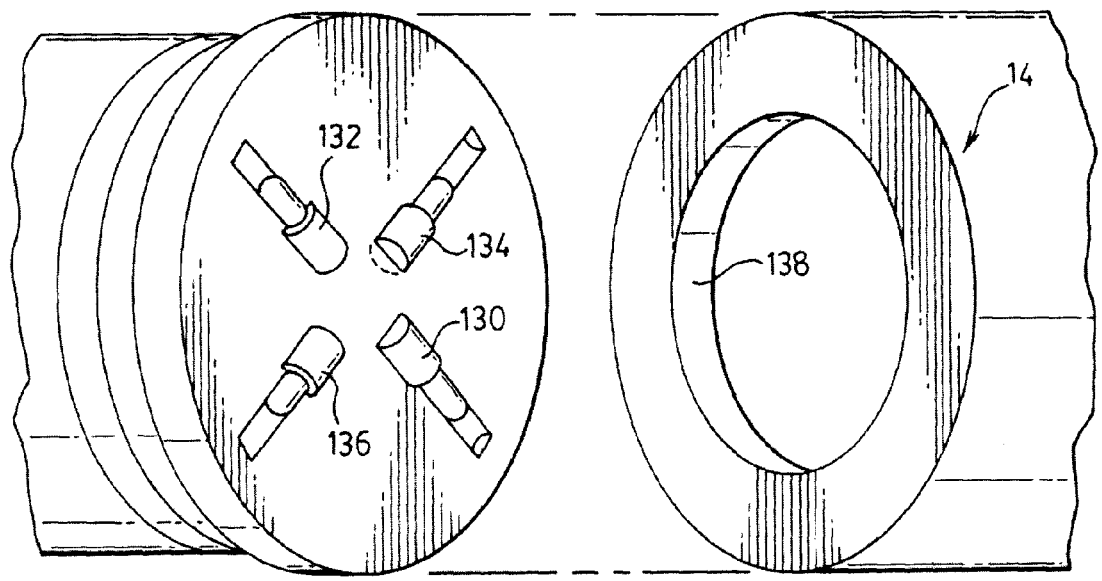
FIG. 8 is a partial perspective exploded view showing a different arrangement for adjustment of the cooling plug relative to the extrusion head.

In FIG. 8, a different arrangement for adjustment of the cooling plug 14 relative to the extrusion head 6 is illustrated. In this embodiment, four pistons 130, 132, 134 and 136 are positioned in the extrusion head 6 and are adjustable to move the cooling plug 14. The cooling plug 14 includes an inner circular contact surface 138 that engages the ends of the adjustable pistons. Movement of these pistons alters the position of the cooling plug and allows alignment of the cooling plug and the mold blocks.

Figure 9:
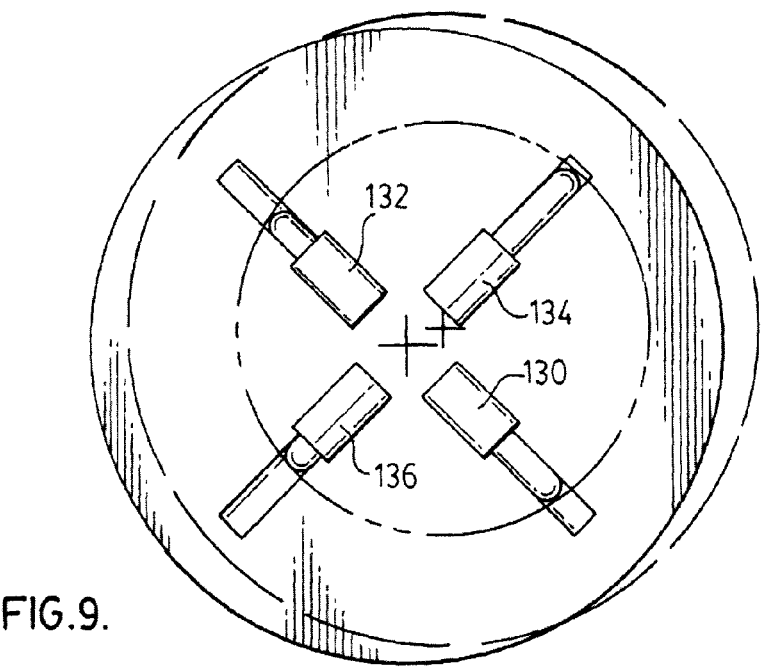
FIG. 9 is an end view showing adjustment of the cooling plug relative to the extrusion head.

In the example illustrated in FIG. 9, the pistons 130 and 132 cooperate as a first pair of pistons and the pistons 134 and 136 cooperate as a second pair of pistons. It can also be appreciated that other arrangements for moving of the cooling plug relative to the extrusion head are possible. In particular, rather than the four adjustable pistons shown in FIGS. 8 and 9, three adjustable pistons can perform the same function.

The operator can determine the appropriate shift required of the cooling plug relative to the extrusion head based on the tolerance variation in the extruded pipe and the orientation of the pipe. The corrective adjustment typically can be inputted to the controller 200 using the angular input and distance adjustment. For example, the maximum wall thickness will be at a particular angle. This angle, in combination with a desired shift can determine the corrective movement for the cooling plug, relative to the extrusion head. The controller can then calculate the necessary movement of the mechanical actuators to appropriately shift the cooling plug 14.

The alignment of the cooling plug 14 with the mold blocks 20 and 22 need not operate as the only adjustment. For example, this adjustment can be used in combination with movement of the extruder or extruder head, relative to the mold blocks or movement of the mold blocks relative to the extruder.

This system is particularly advantageous for molding of pipe having a diameter of greater than 50 cm. High strength plastic pipe can be solid wall while still having a stepped outer surface. In some thick wall pipe of constant thickness, a cooling plug may be desirable and the ability to align the cooling plug with the moving mold tunnel, independent of the extrusion head, can improve performance and cost of manufacture. The apparatus as shown can also be used for the manufacture of other high strength pipe.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A molding apparatus for forming pipe, comprising an extruder, an extrusion head having a die outlet at a downstream end of the extrusion head, a cooling plug and moving mold blocks defining an exterior surface of the pipe; said cooling plug being adjustably secured to said downstream end of said extrusion head by an adjustment mechanism for shifting of a centerline of said cooling plug relative to said downstream end of said extrusion head; said adjusting mechanism being operative during molding of the pipe to adjust alignment of said cooling plug with said mold blocks independently of the position of said extrusion head and said die outlet.

2. A molding apparatus as claimed in claim 1 wherein said cooling plug on an end thereof includes a tapered transition surface located adjacent said extrusion head, said tapered transition surface forming a plastic flow transition path accommodating any offsetting of a longitudinal axis of said cooling plug relative to a longitudinal axis of said extrusion head.

3. A molding apparatus as claimed in claim 2 wherein an exposed end of said tapered transition surface is sized to remain within the cross sectional periphery of said extrusion head at a junction of said extrusion head and said cooling plug to accommodate a maximum offset of said longitudinal axis of cooling plug relative to said extrusion head.

4. A molding apparatus as claimed in claim 1 wherein tapered said cooling plug includes a tapered transition surface adjacent an end of said extrusion head that distributes plastic from the extrusion head to a wider body portion of the cooling plug.

5. A molding apparatus as claimed in claim 1 wherein said extrusion head includes two extrusion passages with a first extrusion passage for extruding plastic for forming outer corrugations of said pipe and a second downstream passage for extruding plastic for forming an inner smooth wall of said pipe.

6. A molding apparatus as claimed in claim 5 including a controller for adjusting the position of said cooling plug relative to said extrusion head.

7. A molding apparatus as claimed in claim 6 wherein said controller includes an angular input and a dimensional input for an operator to effect adjustment of said cooling plug.

8. A molding apparatus as claimed in claim 7 wherein said angular input and said dimensional input are determined based on tolerance variations of the molded pipe.

9. A molding apparatus as claimed in claim 1 wherein said adjustment mechanism includes at least two adjustable locating members engaging said cooling plug and said extrusion head and controlling longitudinal alignment therebetween.

10. A molding apparatus as claimed in claim 1 wherein said adjustment mechanism includes two cam members with each cam member rotating about a different rotational axis, said cam members cooperating for adjusting the position of said cooling plug relative to said extrusion head.

11. A molding apparatus as claimed in claim 1 wherein said adjustment mechanism includes at least two piston members for varying the position of said cooling plug on an end of said extrusion head.

12. A molding apparatus as claimed in claim 1 wherein said adjustment mechanism includes at least three piston members disposed at different angular positions and controlling the position of said cooling plug on an end of said extrusion head.

13. A molding apparatus as claimed in claim 1 wherein said adjustment mechanism includes at least a first pair of opposed pistons and a second pair of opposed pistons with each piston engaging an interior surface of said cooling plug and a central area of said extrusion head.

14. A molding a apparatus as claimed in claim 1 wherein said adjustment mechanism includes a first cam rotatable within a second cam rotatably received in a bearing of said extrusion head, said first cam engaging said cooling plug in an offset position relative to the rotational axis of said first cam, and wherein the rotational axis of said second cam is offset relative to said rotational axis of said first cam.

15. A molding apparatus as claimed in claim 14 wherein each cam includes a control member rotatably supported in said extrusion head where rotation of said control member rotates the respective cam.

16. A molding apparatus as claimed in claim 1 wherein said moving mold blocks are adapted for the manufacture of double wall corrugated pipe or high strength ribbed pipe.

* * * * *